(12) United States Patent
Nessi et al.

(10) Patent No.: US 9,512,890 B2
(45) Date of Patent: Dec. 6, 2016

(54) PARKING CALIPER ASSEMBLY

(71) Applicant: Freni Brembo S.p.A., Curno, Bergamo (IT)

(72) Inventors: Lorenzo Nessi, Curno (IT); Adriano Bonetti, Curno (IT); Cristian Crippa, Curno (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 14/379,211

(22) PCT Filed: Feb. 15, 2013

(86) PCT No.: PCT/IB2013/051236
§ 371 (c)(1),
(2) Date: Aug. 15, 2014

(87) PCT Pub. No.: WO2013/121388
PCT Pub. Date: Aug. 22, 2013

(65) Prior Publication Data
US 2015/0027821 A1 Jan. 29, 2015

(30) Foreign Application Priority Data
Feb. 16, 2012 (IT) .............................. MI2012A0233

(51) Int. Cl.
*F16D 65/00* (2006.01)
*F16D 55/224* (2006.01)
(Continued)

(52) U.S. Cl.
CPC ........... *F16D 65/0075* (2013.01); *B60T 1/065* (2013.01); *F16D 55/224* (2013.01);
(Continued)

(58) Field of Classification Search
CPC ............... F16D 55/224; F16D 65/092; F16D 65/0973; F16D 65/0975; F16D 65/12; F16D 65/0075; F16D 2055/007; F16D 2055/0041; B60T 1/065

USPC ........... 188/72.3, 73.31, 73.36–73.38, 73.44, 188/73.45
See application file for complete search history.

(56) References Cited

U.S. PATENT DOCUMENTS 3,710,896 A * 1/1973 Machek ..................... 188/73.36
3,712,422 A * 1/1973 Haraikawa et al. ......... 188/72.3
(Continued)

FOREIGN PATENT DOCUMENTS

DE 10 2005 044 150 A1 3/2006
GB 2 060 093 A 4/1981
JP 55-152931 A 11/1980

*Primary Examiner* — Thomas J Williams
*Assistant Examiner* — Mariano Sy
(74) *Attorney, Agent, or Firm* — Blank Rome LLP

(57) ABSTRACT

An assembly comprising a caliper body (2) of a caliper assembly for parking disc brake, said caliper body (2) comprising a channel (14), said axial channel (14) being defined by at least one wall having at least one flattened length forming at least one guide surface (15; 16); at least one portion of caliper body (10) projecting towards the disc or above the disc (3), said portion of caliper body (10) comprising a surface facing the disc (11) or at least the friction material (12) of said pad (8), and wherein said surface facing the disc (11) has a flattened length forming at least one abutment surface (12; 13) and wherein said at least one guide surface (15; 16) is oriented differently with respect to said at least one abutment surface (12; 13) so as to avoid that they are mutually coplanar; said guide surface (15; 16) is suitable to face an opposite guide surface (25; 26) provided for on an associable supporting plate (21, 22) of an associable pad (8) in order to allow the positioning and sliding thereof against the caliper body (2) and wherein, in said abutment surface (12, 13), it is suitable to face an opposite abutment surface (27, 28) provided for on the supporting plate (21, 22) of at least one associable pad (8) so as to allow the pad to abut and slide against said abutment surface (12; 13).

7 Claims, 6 Drawing Sheets

(51) Int. Cl.
  *F16D 65/092* (2006.01)
  *F16D 65/097* (2006.01)
  *B60T 1/06* (2006.01)
  *F16D 65/12* (2006.01)
  *F16D 55/00* (2006.01)

(52) U.S. Cl.
  CPC ......... *F16D65/092* (2013.01); *F16D 65/0973* (2013.01); *F16D 65/0975* (2013.01); *F16D 65/12* (2013.01); *F16D 2055/007* (2013.01); *F16D 2055/0041* (2013.01)

(56) References Cited

U.S. PATENT DOCUMENTS

| | | | |
|---|---|---|---|
| 3,722,634 A * | 3/1973 | Ogasawara et al. | 188/73.37 |
| 3,841,444 A | 10/1974 | Baum et al. | |
| 3,976,167 A | 8/1976 | Hirai et al. | |
| 3,986,164 A * | 10/1976 | Hirai et al. | 340/454 |
| 4,056,174 A * | 11/1977 | Wienand et al. | 188/73.36 |
| 4,417,647 A * | 11/1983 | Cotter et al. | 188/73.38 |
| 4,441,588 A * | 4/1984 | Saito | 188/73.38 |
| 4,471,858 A * | 9/1984 | Kawase | 188/73.38 |
| 4,491,204 A * | 1/1985 | Dirauf et al. | 188/73.38 |
| 4,527,669 A * | 7/1985 | Meyer et al. | 188/73.38 |
| 4,775,033 A * | 10/1988 | Heibel | 188/73.43 |
| 4,944,371 A * | 7/1990 | Giorgetti | 188/73.39 |
| 5,257,679 A * | 11/1993 | Weiler et al. | 188/73.32 |
| 7,438,160 B2 * | 10/2008 | Maehara | 188/73.31 |
| 7,810,617 B2 * | 10/2010 | Vanouche et al. | 188/73.38 |
| 7,905,334 B2 * | 3/2011 | Reuter et al. | 188/73.38 |
| 8,251,188 B2 * | 8/2012 | Teper et al. | 188/73.45 |

* cited by examiner

PARKING CALIPER ASSEMBLY

FIELD OF THE INVENTION

The present invention relates to a parking caliper assembly.

In particular, the present invention relates to a parking caliper body to which a, suspension pin for pads and at least one pad suspended to said pin are associated, as well as a suspension spring acting between said pin and said caliper body.

BACKGROUND OF THE PRIOR ART

The document U.S. Pat. No. 5,323,882 by Waterman George H. discloses a pad for brake disc supporting to the caliper body by overhangs of the supporting plate of the friction material arranged laterally to the friction material and received in apposite seats provided for in the caliper body. This embodiment is aimed to the implementation of a caliper body projecting towards the braking disc so as to form abutment surfaces arranged on the pad sides. Such a solution is particularly bulky, especially in the circumferential direction.

The document DE 38 39 477 by Alfred Teves GmbH shows a pad having a supporting plate projecting radially externally to the friction material, thus forming two side loops for the suspension thereof to the caliper body. The plate with its edge of the side portion to the friction material rests and discharges the braking actions on the bracket body that is integral to the hub. In this case also, this solution is particularly bulky, since it requires the provision of a bracket projecting towards the disc to provide an abutment surface laterally to the pad.

The document U.S. Pat. No. 7,316,301 by Meritor Heavy Vehicle Braking System Ltd. shows a pad provided with a plate having upper lugs to the friction material resting on the caliper body.

Other solutions are known by U.S. Pat. No. 3,841,444 A, JP 55 152931 A, DE 10 2005 044150 A1, U.S. Pat. No. 3,976,167 A, GB 2 060 093 A. However, none of these solutions allows reducing the overall dimensions of the parking caliper assembly, housing, supporting, and guiding a pad for disc brakes.

SOLUTION

Therefore, it is the object of the present invention to devise a parking caliper assembly allowing to house, support, and guide a pad for disc brakes reducing the overall dimensions of its coupling to the caliper body.

A further object of the present invention is to propose a caliper assembly for parking disc brake allowing a coupling between caliper body and pad that interferes the least possible with the disc for disc brake, avoiding to be arranged laterally to the friction material of the pad. Therefore, it is the object of the present invention to devise a caliper assembly for parking disc brake, which has such structural and functional characteristics as to meet the above-mentioned needs, while obviating the drawbacks referred to with reference to the prior art.

Such a problem is solved by a caliper assembly for a parking disc brake as defined in the appended claims.

In accordance with a general embodiment, a caliper assembly for parking disc brake comprises:

a parking caliper body arranged astride of a disc for disc brake so as to exert, on at least one braking surface thereof, a braking action capable of holding a vehicle in a parking position;

Said disc having a substantially axially symmetrical body suitable to rotate about a rotational axis defining an axial direction to the disc (A-A), a direction orthogonal to this axial direction or radial direction to the disc (R-R) and a direction orthogonal to said axial direction and said radial direction or tangential direction to the disc (T-T) or circumferential direction, and forming said opposite braking surfaces;

said caliper body comprising a pin seat suitable to receive a suspension pin of at least one pad for disc brake;

an upper surface of the caliper body facing the side opposite to the braking disc or to the friction material of at least one received pad;

a channel directed according to a direction parallel to the axial direction (A-A) or a sliding direction of at least one pad approaching to or moving away from one of the braking surfaces of the disc; said channel being obtained in a portion of the caliper body arranged astride of or above said disc, avoiding that it arranges at the side of the disc or its braking surfaces;

said axial channel being defined by at least one wall having at least one flattened length forming at least one guide surface;

said portion of caliper body projecting astride of the disc or above the disc comprising a surface facing the disc or at least the friction material of said pad, wherein said surface facing the disc has a flattened length forming at least one abutment surface, and wherein said at least one guide surface is oriented differently with respect to said at least one abutment surface so as to avoid that said guide surface and said abutment surface are coplanar;

said assembly further comprising:

at least one suspension pin of at least one pad for disc brake having at least one pin end received with clearance in said pin seat provided for in the caliper body; wherein said suspension pin is arranged astride of said disc;

at least one pad for disc brake (comprising friction material suitable to abut against a braking surface of the disc when said pad is urged by thrust means housed in said caliper body;

said at least one pad comprising a supporting plate comprising a plate portion extending outwardly of the friction material, so as to avoid that it faces the braking surfaces of the disc and so as to move radially outwardly and outside the area of the pad that can be arranged facing the disc;

said plate portion comprising a coupling loop receiving with clearance said suspension pin to suspend said at least one plate to the suspension pin allowing it to freely slide approaching to or moving away from the disc;

said plate portion further comprising:

a flattened length to form an opposite guide surface that is arranged facing said at least one guide surface to slide thereon;

a further flattened length to form at least one opposite abutment surface suitable to abut against said at least one abutment surface;

said assembly further comprising:
at least one suspension spring anchoring with the ends thereof to the upper surface of the caliper body and passes around the suspension pin below it on the opposite side to said upper surface to move said pin away from the disc and to move it away from the disc together with the suspended pad by affecting said pin and the suspended pad in a substantially radial direction away from the disc rotational axis, bringing said opposite abutment surface to abut against said abutment surface and keeping said opposite guide surface free to slide along said guide surface, so as to avoid that said abutment surface and said opposite abutment surface, as well as said guide surface and said opposite guide surface are arranged laterally to the disc at the side of the disc braking surfaces.

Advantageously, said abutment surface and said guide surface are arranged mutually substantially orthogonal, and said opposite abutment surface and said opposite guide surface are arranged mutually substantially orthogonal.

In accordance with a general embodiment of the invention, a caliper assembly for parking disc brake comprises a parking caliper body arranged astride of a disc for disc brake, so as to exert, on at least one braking surface thereof, a braking action capable of holding a vehicle in a parking position. Said disc has a substantially asymmetric body suitable to rotate about a rotational axis defining an axial direction to the disc A-A, a direction orthogonal to said axial direction or radial direction to the disc R-R, and a direction orthogonal to said axial direction and said radial direction or direction tangential to the disc T-T, or circumferential direction.

Said caliper body further comprises a pin seat suitable to receive a suspension pin of at least one pad for disc brake. Said caliper body has an upper surface of the caliper body facing the side opposite to the braking disc.

Advantageously, said caliper body has a channel directed according to a direction parallel to the axial direction A-A, or a sliding direction of at least one pad approaching to one of the disc braking surfaces. Said axial channel is defined by at least one wall having at least one flattened length forming at least one guide surface.

Advantageously, at least one portion of caliper body projecting towards the disc or above the disc comprises a surface facing the disc, or at least the friction material of said pad. With particular advantage, said surface facing the disc has a flattened length forming at least one abutment surface.

Advantageously, said at least one guide surface is oriented differently with respect to said at least one abutment surface so as to avoid that they are mutually coplanar.

Preferably, said assembly further comprises at least one suspension pin of at least one pad for disc brake that has at least one pin end received with clearance in said pin seat provided for in the caliper body.

Said assembly further comprises at least one pad for disc brake having friction material suitable to abut against a braking surface of the disc when said pad is urged by thrust means housed in said caliper body. Advantageously, said at least one pad comprises a supporting plate of said friction material comprising a plate portion extending outside the friction material so as to move outside the area of the pad that can be arranged facing the disc or, in accordance with a particular embodiment, it extends radially outwardly of said friction material.

Advantageously, said plate portion comprises a coupling loop receiving with clearance said suspension pin so as to suspend said at least one pad to the suspension pin, allowing it to freely slide approaching to and moving away from the disc.

Advantageously, said plate portion further comprises a flattened length to form an opposite guide surface that is arranged facing said at least one guide surface of the caliper body to abut and to slide thereon. With further advantage, a further flattened length is provided for on said plate at the plate portion comprising the loop and to form at least one opposite abutment surface suitable to abut against said at least one abutment surface and to slide thereon.

With particular advantage, said assembly further comprises at least one suspension spring anchoring with the free ends thereof to the upper surface of the caliper body and with its body passes around the suspension pin below it on the opposite side to said upper surface to move said pin away from the disc and to affect it to move away from the disc or the friction material together with the suspended pad, bringing said opposite abutment surface to abut against said abutment surface of the caliper body and keeping said opposite guide surface free to slide along said guide surface.

In accordance with a further general embodiment, a caliper assembly for disc brake comprises a caliper body arranged astride of a disc for disc brake, so as to exert on at least one braking surface thereof a braking action capable of holding a vehicle in a parking position.

Preferably, said disc has a substantially asymmetric body suitable to rotate about a rotational axis defining an axial direction of the disc A-A, a direction orthogonal to said axial direction or radial direction of disc R-R and, finally, a direction orthogonal to said axial direction and said radial direction or tangential direction of disc T-T or circumferential direction.

Advantageously, said caliper body comprises a channel directed according to a direction parallel to the axial direction or a sliding direction of at least one pad approaching to one of the braking surface of the disc. Preferably, said axial channel is defined by at least one wall having at least one flattened length forming at least one guide surface. Advantageously, at least one portion of caliper body projecting towards the disc or above the disc comprises a surface facing the disc, or at least facing the friction material, which has a flattened length to form at least one abutment surface.

Said at least one guide surface and said at least one abutment surface are mutually differently oriented, so as to avoid to be coplanar.

Said assembly further comprises at least one pad for disc brake comprising friction material suitable to abut against a braking surface of the disc when said pad is urged by thrust means housed in said caliper body.

Advantageously, said at least one pad comprises a supporting plate having a plate portion extending outside of the friction material radially outwardly, so as to move outside of the area of the pad that can be arranged facing the disc.

Preferably, said plate portion comprises a flattened length to form an opposite guide surface arranging facing said at least one guide surface to slide thereon. Advantageously, a further flattened length is provided for on said plate to form at least one opposite abutment surface suitable to abut against said at least one abutment surface of the caliper body.

For example, but not necessarily, said plate portion is arranged substantially centrally to said pad.

In accordance with an embodiment, said flattened lengths to form the opposite abutment guide surfaces are obtained on the edge of the pad plate.

In accordance with a further embodiment, the guide surfaces are in a number of two and they are mutually opposite and mutually parallel, as well as parallel to a radial direction and also to an axial direction.

In accordance with an embodiment, the opposite abutment surfaces are in a number of two and they are mutually parallel, for example, but not necessarily, mutually coplanar, as well as, for example, but not necessarily, parallel to a tangential direction.

In accordance with an embodiment, said opposite abutment surfaces and said opposite guide surfaces are mutually substantially orthogonal.

The above-described solutions allow housing, supporting, and guiding a pad for disc brakes by considerably reducing the overall dimensions of its coupling to the caliper body, while allowing a coupling between the caliper body and the pad that absolutely does not interfere with the disc for disc brake, particularly, avoiding that it is arranged laterally to the friction material of the pad.

The arrangement of the pad of the caliper body as proposed above allows implementing a coupling between caliper body and pad that arranges completely above or radially outwardly of the friction material, i.e., it arranges completely above or radially outside with respect to the rotational axis of the disc and with respect to the friction surface of the disc.

The above-described solutions allow to couple the pad in a suspended manner to a pin connected to the caliper body, which pin is arranged transversally to and above the disc for disc brake.

These solutions allow a very accurate operation of the parking caliper assembly, in particular an accurate sliding of the pad against the caliper body and an accurate transmission of the braking stresses of the pad in the caliper body, while keeping very reduced overall dimensions of the coupling. It results that the proposed assembly exhibits an operation that is accurate, safe, and reliable over time, independently from the use of the assembly in a highly polluted, wide thermal range environment, also possibly with dust capable of enter the coupling itself between the pad and the caliper body.

The proposed solutions is particularly suitable to be used in floating parking calipers, wherein the entire coupling between pads and caliper body is confined within the floating body.

FIGURES

Further characteristics and advantages of the caliper assembly for disc brake according to the invention will be apparent from the description set forth below of preferred implementation examples thereof, given by way of illustrative, non-limiting example, with reference to the appended Figures, in which.

Figure 1:
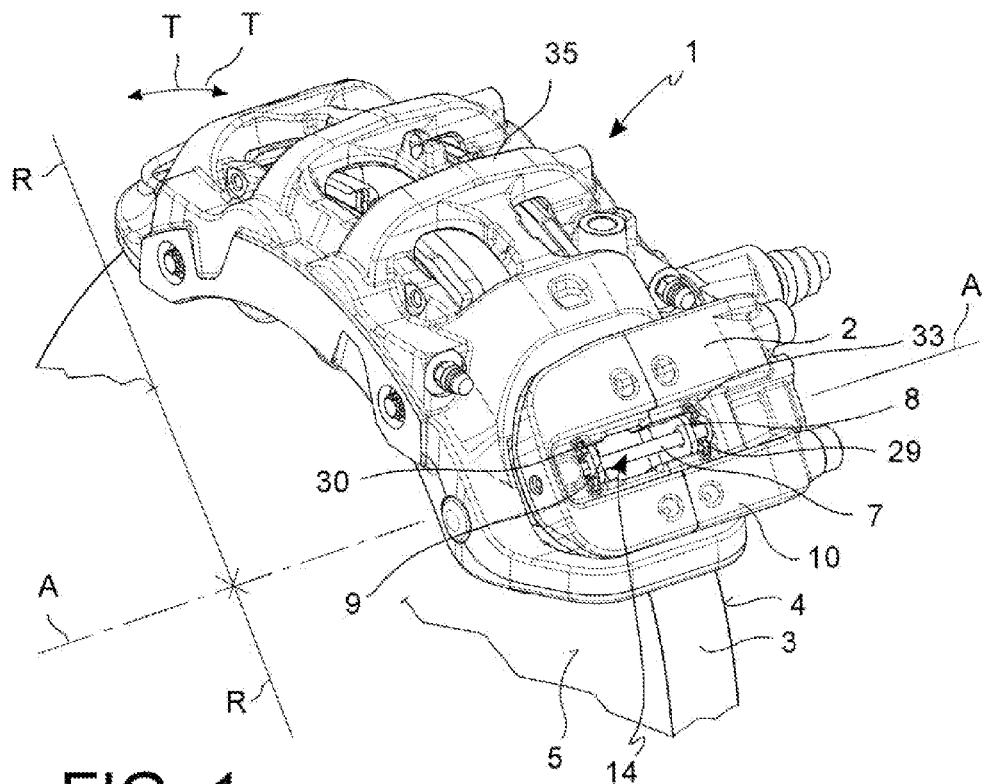
FIG. 1 represents in a wheel side axonometric view a fixed caliper to which a parking caliper assembly is associated.
Figure 2:
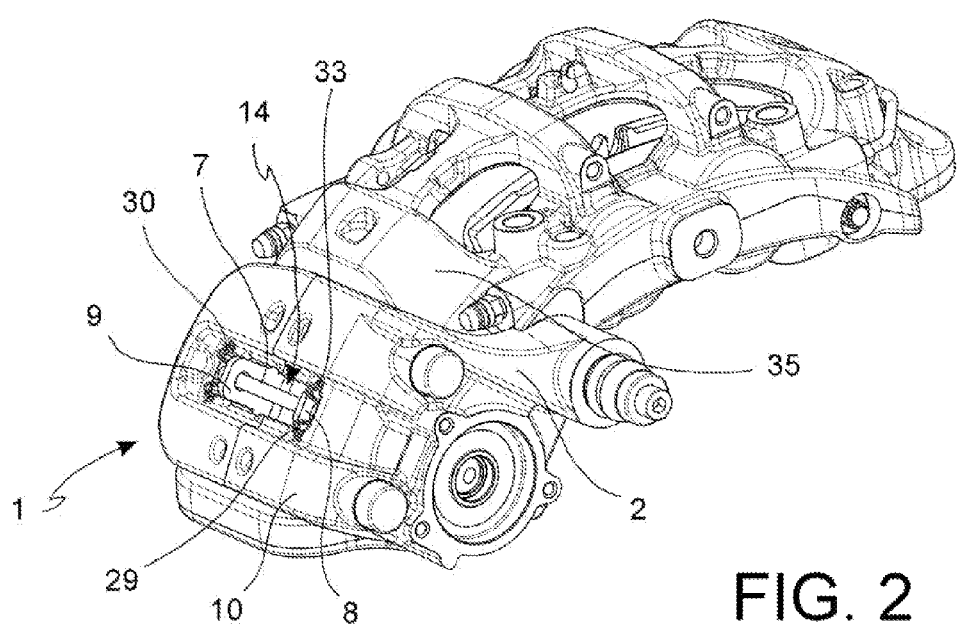
FIG. 2 represents a vehicle side axonometric view of the assembly of FIG. 1.
Figure 3:
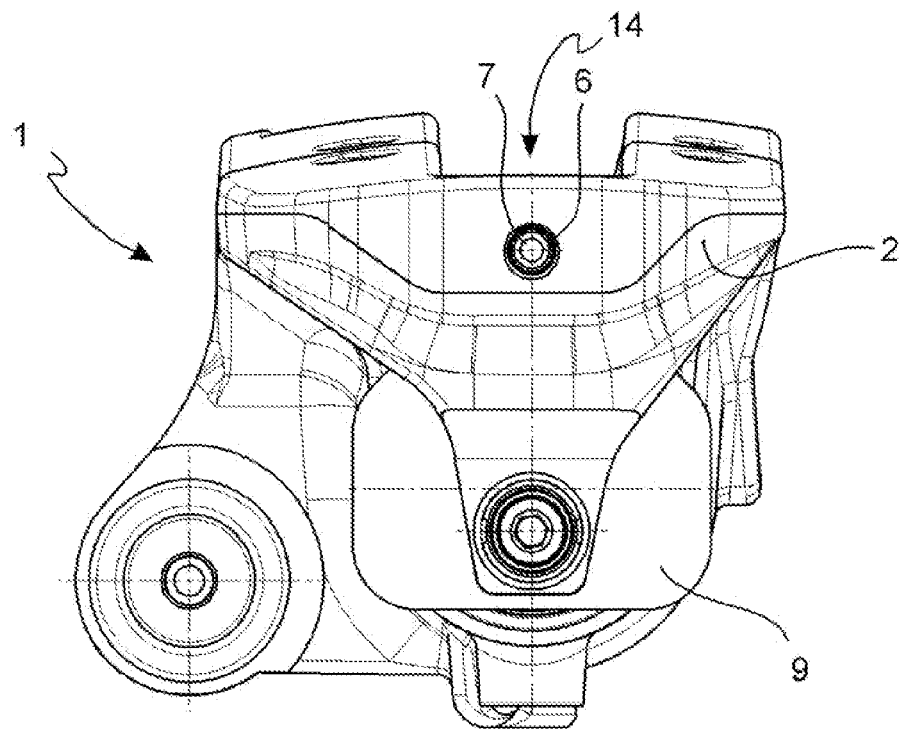
FIG. 3 represents in a wheel side front view a parking caliper assembly.
Figure 4:
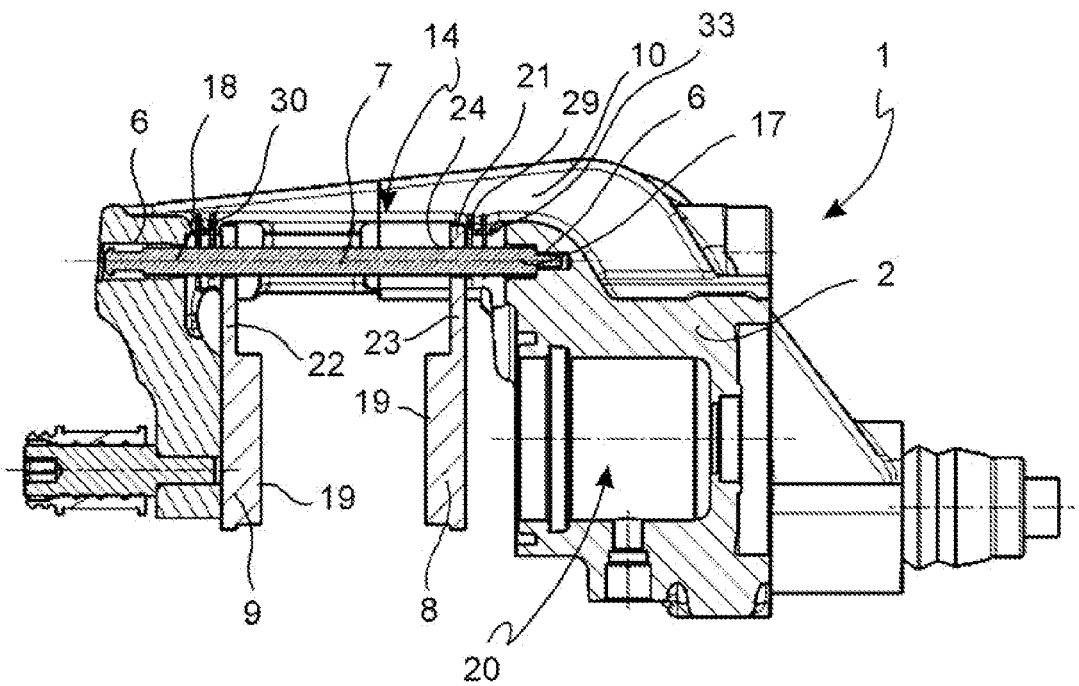
FIG. 4 represents a section according to an axial-radial plane of the assembly of FIG. 3.
Figure 5:
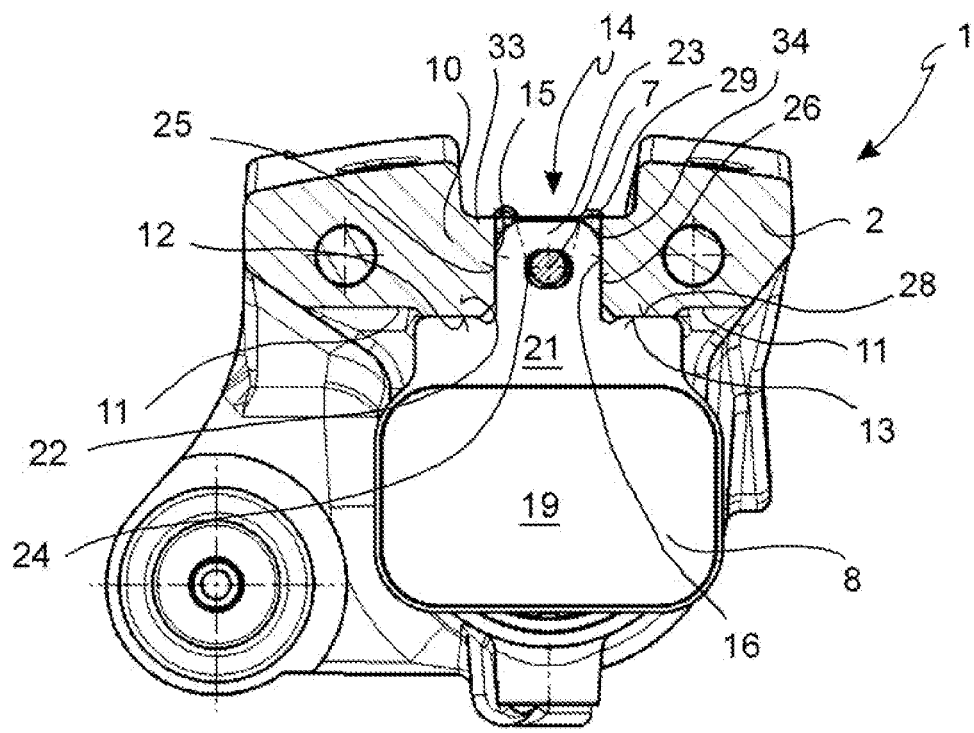
FIG. 5 represents a section according to a tangential plane substantially along the center line (or disc plane) of the parking caliper assembly of FIG. 3.
Figure 6:
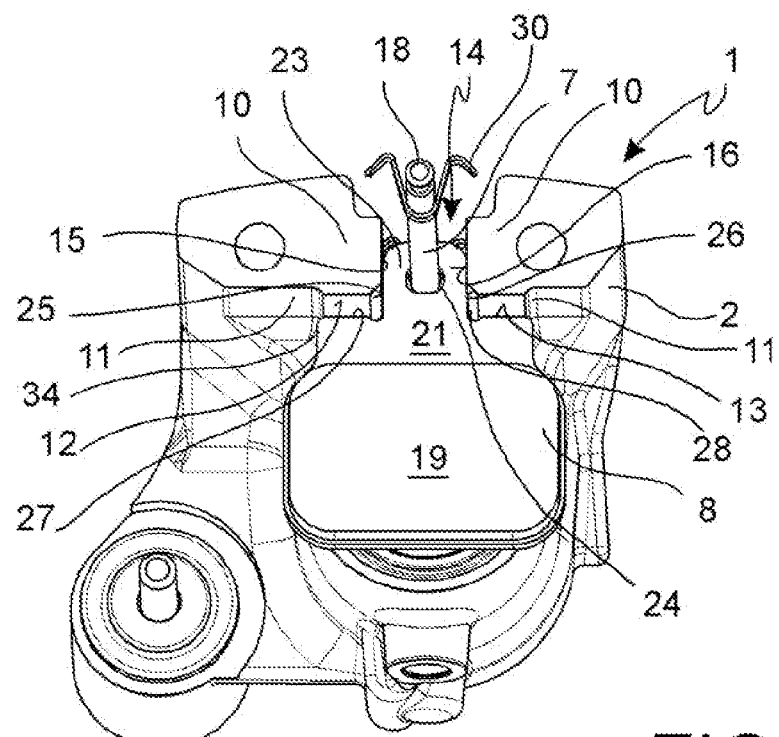
Figure 7:
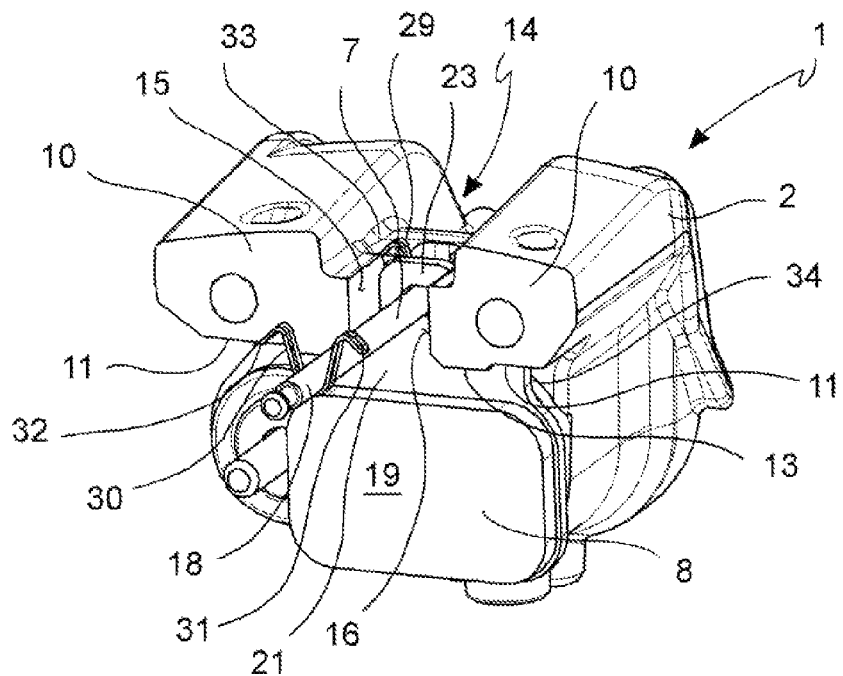
Figure 8:
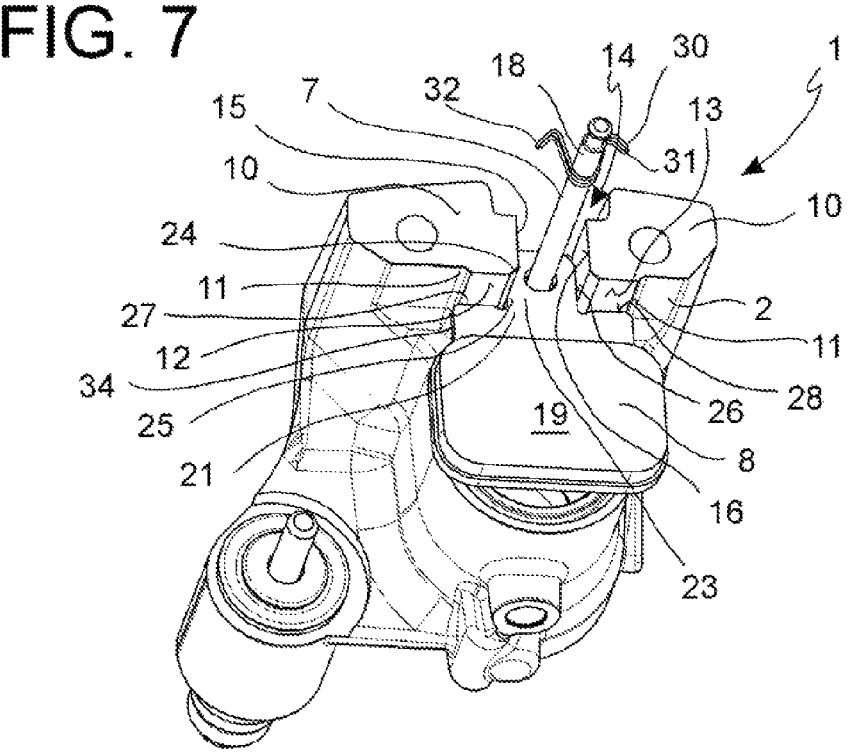
Figure 9:
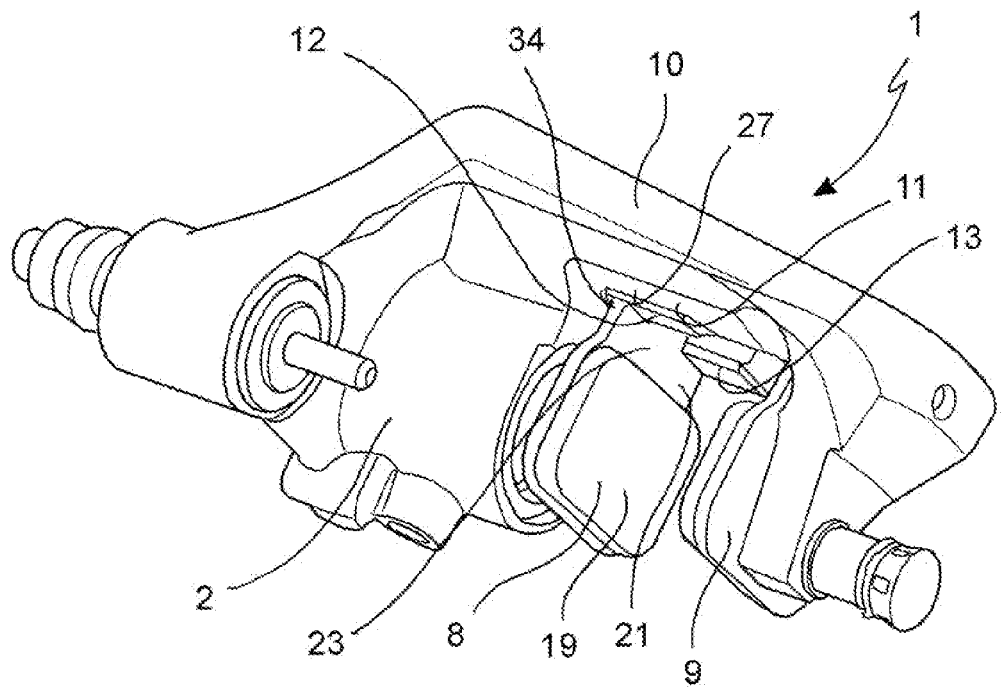
Figure 10:
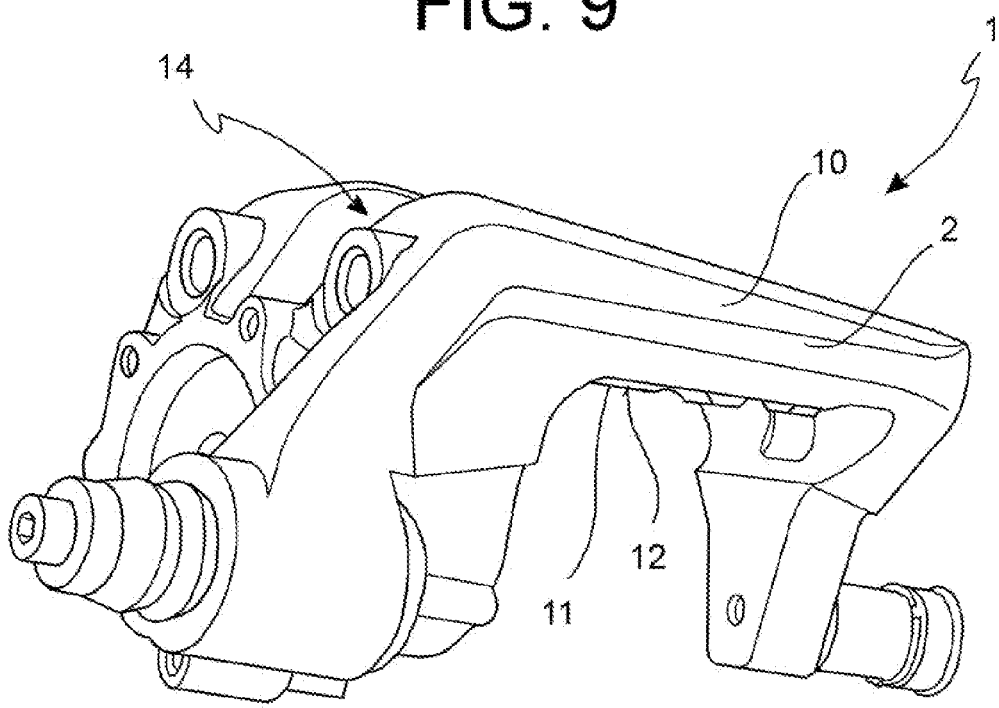
Figure 11:
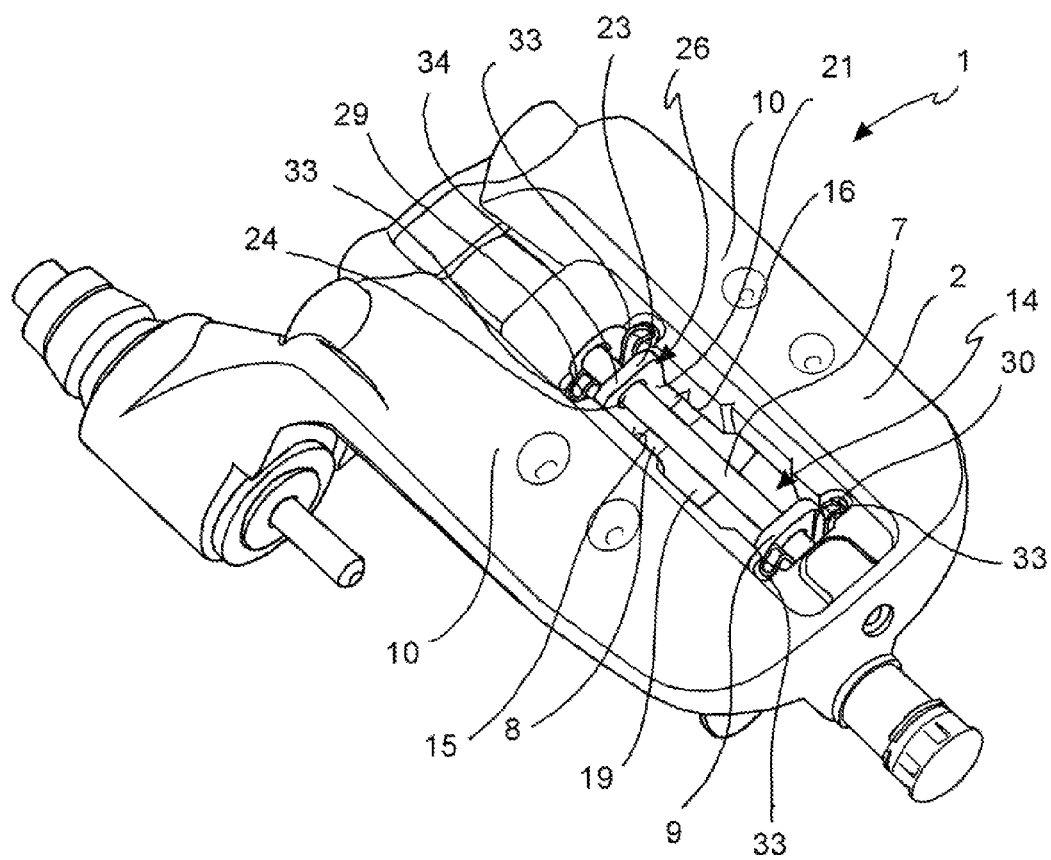

FIGS. 5, 6, 7, and 8 represent in an axonometric view the assembly of FIG. 3, in which the floating body of the parking caliper is sectioned along a tangential radial plane and the pad on the wheel side has been removed;

FIGS. 9 and 11 represent the assembly of FIG. 3 in axonometric views on the wheel side and from above;

FIG. 10 represents the assembly of FIG. 3 without the pads, the suspension pin of the pads, and the springs urging the pin.

DESCRIPTION OF PREFERRED EMBODIMENTS

With reference to the above-mentioned figure, a caliper assembly for parking disc brake 1 comprises a parking caliper body 2 arranged astride of a disc for disc brake 3 so as to exert, on at least one braking surface 4; 5 thereof, a braking action capable of holding a vehicle in a parking position.

In accordance with an embodiment, said disc 3 has a substantially asymmetric body suitable to rotate about a rotational axis defining an axial direction to the disc A-A, a direction orthogonal to this axial direction or radial direction to the disc R-R, and a direction orthogonal to said axial direction and said radial direction or tangential direction to the disc T-T, or circumferential direction.

In accordance with an embodiment, said caliper body 2 comprises a pin seat 6 suitable to receive a suspension pin 7 of at least one pad for disc brake 8; 9.

In accordance with an embodiment, an upper surface of the caliper body 33 faces the side opposite to the braking disc 3 or the friction material of at least one received pad 8; 9.

In accordance with an embodiment, a channel 14 is provided for in said caliper body, directed according to a direction parallel to the axial direction A-A or a sliding direction of at least one pad 8; 9 approaching to or moving away from one of the braking surfaces 4; 5 of the disc 3.

In accordance with an embodiment, said axial channel 14 is defined by at least one wall having at least one flattened length forming at least one guide surface 15; 16.

In accordance with an embodiment, at least one portion of caliper body 10 projecting towards the disc or above the disc 3 comprises a surface 11 facing the disc or at least the friction material 12 of said pad 8; 9.

In accordance with an embodiment, said surface 11 facing the disc has a flattened length forming at least one abutment surface 12; 13.

In accordance with an advantageous embodiment, said at least one guide surface 15; 16 is oriented differently with respect to said at least one abutment surface 12; 13 so as to avoid that said guide surface and said abutment surface are mutually coplanar.

In accordance with an embodiment, said assembly further comprising at least one suspension pin 7 of at least one pad for disc brake 8; 9 having at least one pin end 17; 18 received with clearance in said pin seat 6 provided for in the caliper body 2

In accordance with an embodiment, at least one pad for disc brake 8; 9 comprises friction material 19 suitable to abut against a braking surface 4; 5 of the disc 3 when said pad 8; 9 is urged by thrust means 20 housed in said caliper body 2.

In accordance with an embodiment, said at least one pad 8; 9 comprises a supporting plate 21; 22 comprising a plate portion 23 extending outside of the friction material 19 so as to move radially outwardly and outside the area of the pad 8; 9 that can be arranged facing the disc 3.

In accordance with an embodiment, said plate portion 23 comprises a coupling loop 24 receiving with clearance said suspension pin 7 to suspend said at least one plate 8; 9 to the suspension pin 7, allowing it to freely slide approaching to or moving away from the disc 3.

In accordance with an embodiment, said plate portion 23 further comprising a flattened length to form an opposite guide surface 25; 26 that arranges facing said at least one guide surface 15; 16 to slide thereon.

In accordance with an embodiment, said plate portion 23 further comprising a further flattened length to form at least one opposite abutment surface 27; 28 suitable to abut against said at least one abutment surface 12; 13.

In accordance with an embodiment, said assembly further comprising at least one suspension spring 29; 30 anchoring with the ends thereof 31; 32 to the upper surface 33 of the caliper body 2 and which passes around the suspension pin 7 below it on the opposite side to said upper surface 33 to move said pin 7 away from the disc 3 and to affect it away from the disc together with the suspended pad 8; 9, bringing said opposite abutment surface 27; 28 to abut against said abutment surface 12; 13 and keeping said opposite guide surface 25; 26 free to slide along said guide surface 15; 16.

In accordance with an embodiment, said flattened lengths to form opposite guide surfaces 25; 26 and/or abutment surfaces 27; 28 are obtained at the edge 34 of the plate 21; 22 of the pad 8; 9.

In accordance with an embodiment, said guide surfaces 15; 16 are two guide surfaces 15, 16.

In accordance with an embodiment, said guide surfaces 15, 16 are mutually opposite.

In accordance with an embodiment, said guide surfaces 15, 16 are mutually parallel and parallel to the axial direction A-A, as well as to the radial direction R-R.

In accordance with an embodiment, said opposite guide surfaces 25; 26 are two opposite guide surfaces 25, 26.

In accordance with an embodiment, said opposite guide surfaces 25, 26 are mutually opposite.

In accordance with an embodiment, said opposite guide surfaces 25, 26 are mutually parallel and parallel to the axial direction A-A, as well as to the radial direction R-R.

In accordance with an embodiment, said abutment surfaces 12; 13 are two abutment surfaces 12, 13.

In accordance with an embodiment, said abutment surfaces 12, 13 are mutually parallel.

In accordance with an embodiment, said abutment surfaces 12, 13 are mutually coplanar.

In accordance with an embodiment, said abutment surfaces 12, 13 are mutually parallel and parallel to the tangential direction T-T.

In accordance with an embodiment, said opposite abutment surfaces 27; 28 are two opposite abutment surfaces 27, 28.

In accordance with an embodiment, said opposite abutment surfaces 27, 28 are mutually opposite.

In accordance with an embodiment, said opposite abutment surfaces 27, 28 are mutually coplanar.

In accordance with an embodiment, said opposite abutment surfaces 27, 28 are mutually parallel and parallel to the axial direction A-A.

In accordance with an embodiment, the guide surfaces 15, 16 are substantially orthogonal to the abutment surfaces 12, 13.

In accordance with an embodiment, the opposite guide surfaces 25, 26 are substantially orthogonal to the opposite abutment surfaces 27; 28.

In accordance with an embodiment, said caliper body 2 is a floating caliper body suitable to slide with respect to one support 25 thereof.

In accordance with an embodiment, said caliper body 2 comprises thrust means 20 of the pad 8 arranged only at one side of the disc and it transfers the braking action to the opposite pad 9 by an axial displacement of said caliper body 2.

In accordance with an embodiment, said caliper body 2 is of the floating type and it slides axially supported by a separated caliper body 35, for example, but not necessarily, of the fixed type with thrust means of the pads on the side thereof facing the vehicle and also on the side thereof facing the wheel.

In accordance with an embodiment, said supporting caliper body 35 is a caliper body of the fixed type.

In accordance with a general embodiment, a pad 8; 9 of caliper assembly for disc brake comprises friction material 19 suitable to abut against a braking surface 4, 5 in a disc 3 of disc brake, when said pad 8; 9 is urged by thrust means 20 housed in a caliper body 2.

In accordance with an embodiment, said pad 8; 9 comprises a supporting plate 21; 22 comprising a plate portion 23 extending outwardly of the friction material 19 so as to move radially outside the area of the pad 8; 9 that can be arranged facing the disc 3.

In accordance with an embodiment, said plate portion 23 comprises a flattened length to form an opposite guide surface 25; 26 suitable to arrange itself facing at least one guide surface 15; 16 of the caliper body 2 to abut and slide thereon.

In accordance with an embodiment, said plate portion 23 further comprising a further flattened length to form at least one opposite abutment surface 27; 28 suitable to abut against and to slide on at least one abutment surface 12; 13 of the caliper body 2.

In accordance with an embodiment, said at least one opposite guide surface 25; 26 is oriented differently with respect to said at least one opposite abutment surface 27; 28 so as to avoid that said opposite guide surface and said opposite abutment surface are coplanar.

In accordance with an embodiment, said plate portion 23 extends radially in the radial direction on the opposite side with respect to the rotational axis A-A of the disc 3 which said pad 8; 9 faces, preferably, but not necessarily in a central position to the pad 8, 9 when the pad is observed in the tangential direction T-T.

In accordance with an embodiment, said flattened lengths to form opposite guide surfaces 25; 26 and/or abutment surfaces 27; 28 are obtained at the edge of the plate of the pad.

In accordance with an embodiment, said opposite guide surfaces 25; 26 are two opposite guide surfaces 25, 26.

In accordance with an embodiment, said opposite guide surfaces 25; 26 are opposite guide surfaces 25, 26 and/or in which they are mutually parallel and parallel to the axial direction A-A and also to the radial direction R-R.

In accordance with an embodiment, said opposite abutment surfaces 27; 28 are two opposite abutment surfaces 27, 28.

In accordance with an embodiment, they are mutually parallel opposite abutment surfaces 26, 28.

In accordance with an embodiment, they are coplanar opposite abutment surfaces 27, 28.

In accordance with an embodiment, they are opposite abutment surfaces 27, 28 that are mutually parallel and parallel to the tangential direction T-T.

In accordance with an embodiment, said opposite guide surfaces 25, 26 are substantially orthogonal to the opposite abutment surfaces 27, 28.

In accordance with an embodiment, a caliper body 2 of a caliper assembly for parking disc brake comprises a caliper body 2 arranged astride of a disc for disc brake so as to exert, on at least one braking surface 4, 5 thereof, a braking action capable of holding a vehicle in a parking position.

In accordance with an embodiment, said caliper body 2 comprises a channel 14 directed according to a direction parallel to the direction A-A or a sliding direction of at least one pad 8; 9 approaching to or moving away from one of the braking surfaces 4; 5 of the disc 3.

In accordance with an embodiment, said axial channel 14 is defined by at least one wall having at least one flattened length forming at least one guide surface 15; 16.

In accordance with an embodiment, said caliper body comprises at least one portion of caliper body 10 projecting towards the disc or above the disc 3.

In accordance with an embodiment, this portion of caliper body 10 comprises a surface 11 facing the disc or at least the friction material 12 of said pad 8; 9.

In accordance with an embodiment, said surface 11 facing the disc has a flattened length forming at least one abutment surface 12; 13.

In accordance with an embodiment, said at least one guide surface 15; 16 is oriented differently with respect to said at least one abutment surface 12; 13 so as to avoid that they are mutually coplanar.

In accordance with an embodiment, said guide surface 15; 16 is suitable to face an opposite guide surface 25; 26 provided for on an associable supporting plate 21, 22 of an associable pad 8; 9 in order to allow the abutment and sliding thereof against the caliper body 2.

In accordance with an embodiment, said abutment surface 12, 13 is suitable to face an opposite abutment surface 27, 28 provided for on the supporting plate 21, 22 of at least one associable pad 8, 9 so as to allow the pad to abut and slide against said abutment surface 12; 13.

It shall be apparent that those of ordinary skill in the art, in order to meet contingent, specific needs, will be able to make a number of modifications and variations to the brake caliper body according to the invention, all falling within the protection scope of the invention, as defined by the following claims.

| REFERENCES | |
|---|---|
| 1 | assemby |
| 2 | parking caliper body |
| 3 | disc for disc brake |
| 4 | first braking surface facing the vehicle |
| 5 | second braking surface facing the wheel |
| 6 | pin seat provided for in the caliper body |
| 7 | suspension pin |
| 8 | first pad facing the vehicle side |
| 9 | second pad facing the wheel side |
| 10 | caliper portion projecting above disc |
| 11 | caliper body surface facing the disc |
| 12 | first abutment surface |
| 13 | second abutment surface |
| 14 | axial channel |
| 15 | first guide surface |
| 16 | second guide surface |
| 17 | first end of suspension pin |
| 18 | second end of suspension pin |
| 19 | friction material of the pad |
| 20 | thrust means |
| 21 | first supporting plate |
| 22 | second supporting plate |
| 23 | plate portion with radial overhang |
| 24 | plate pin coupling loop |
| 25 | first opposite guide surface |
| 26 | second opposite guide surface |
| 27 | first opposite abutment surface |
| 28 | second opposite abutment surface |
| 29 | first suspension spring |
| 30 | second suspension spring |
| 31 | first spring end |
| 32 | second spring end |
| 33 | upper caliper body surface |
| 34 | pad edge |
| 35 | supporting caliper body |

The invention claimed is:

1. A caliper assembly for parking disc brake comprising,
a parking caliper body arranged astride of a disc for disc brake so as to exert, on at least one braking surface thereof, a braking action capable of holding a vehicle in a parking position;
said disc having a substantially axially symmetrical body suitable to rotate about a rotational axis defining an axial direction to the disc, a direction orthogonal to said axial direction or a radial direction to the disc, and a direction orthogonal to said axial direction and said radial direction or a tangential direction to the disc or a circumferential direction, and forming opposite braking surfaces;
said caliper body comprising
a pin seat suitable to receive a suspension pin of at least one pad for disc brake;
an upper surface of the caliper body facing the side opposite with respect to the braking disc or friction material of at least one received pad;
a channel directed according to a direction parallel to the axial direction or a sliding direction of at least one pad approaching to or moving away from one of the braking surfaces of the disc; said channel being obtained in a portion of the caliper body arranged astride or above said disc;
said channel being defined by at least one wall having at least one flattened length forming at least one guide surface;
said portion of caliper body projecting astride of the disc or above the disc comprising a surface facing the disc or at least the friction material of said pad, wherein
said surface facing the disc has a flattened length forming at least one abutment surface,
and wherein
said at least one guide surface is oriented differently with respect to said at least one abutment surface so as to avoid that said guide surface and said abutment surface are coplanar;
said assembly further comprising:
at least one suspension pin of at least one pad for disc brake having at least one pin end received with clearance in said pin seat provided for in the caliper body; wherein said suspension pin is arranged astride of said disc;
at least one pad for disc brake comprising friction material suitable to abut against a braking surface of the disc when said pad is urged by thrust means housed in said caliper body;

said at least one pad comprising a supporting plate comprising a plate portion extending outwardly of the friction material, so as to avoid facing the braking surface of the disc and so as to move radially outwardly and outside the area of the pad that can be arranged facing the disc;

said plate portion comprising a coupling loop receiving, with clearance, said suspension pin to suspend said at least one supporting plate to the suspension pin, allowing the pad to freely slide toward or moving away from the disc;

said plate portion further comprising:
a flattened length to form an opposite guide surface arranging facing said at least one guide surface to slide thereon;
a further flattened length to form at least one opposite abutment surface suitable to abut against said at least one abutment surface;

said assembly further comprising:
at least one suspension spring anchoring with the ends thereof to the upper surface of the caliper body and which passes around and below the suspension pin on the opposite side to said upper surface to move said pin away from the disc and to cause the pin to move away from the disc together with the suspended pad affecting said pin and the suspended pad in a substantially radial direction away from the rotational axis of the disc, bringing said opposite abutment surface to abut against said abutment surface and keeping said opposite guide surface free to slide along said guide surface, so as to avoid that said abutment surface and said opposite abutment surface, as well as said guide surface and said opposite guide surface are arranged laterally to the disc at the side of the braking surfaces of the disc.

2. The assembly according to claim 1, wherein said flattened lengths to form opposite guide and/or abutment surfaces are obtained at the edge of the plate of the pad.

3. The assembly according to claim 1, wherein
said at least one guide surface comprises two guide surfaces, and/or wherein
said guide surfaces are mutually opposite, and/or wherein
said guide surfaces are mutually parallel and parallel to the axial direction, as well as to the radial direction, and/or wherein
said guide surfaces are two opposite guide surfaces, and/or wherein
said opposite guide surfaces are mutually parallel and parallel to the axial direction, as well as to the radial direction.

4. The assembly according to claim 3, wherein said at least one abutment surface comprises two abutment surface, and/or wherein
said abutment surfaces are mutually parallel, and/or wherein
said abutment surfaces are mutually coplanar, and/or wherein
said abutment surfaces are mutually parallel and parallel to the tangential direction; and/or wherein
said abutment surfaces are two opposite abutment surfaces, and/or wherein
said opposite abutment surfaces are mutually coplanar, and/or wherein
said opposite abutment surfaces are mutually parallel and parallel to the axial direction.

5. The assembly according to claim 4, wherein the guide surfaces are substantially orthogonal to the abutment surfaces; and/or wherein the opposite guide surfaces are substantially orthogonal to the opposite abutment surfaces.

6. The assembly according to claim 1, wherein said caliper body is a floating caliper body suitable to slide with respect to one support thereof, and/or wherein said caliper body comprises thrust means of the pad arranged only at one side of the disc and the thrust means transfers the braking action to the opposite pad by an axial displacement of said caliper body.

7. The assembly according to claim 1, wherein said caliper body is of the floating type and slides axially supported by a separated caliper body, and/or wherein said supporting caliper body is a caliper body of the fixed type.

* * * * *